United States Patent Office 3,317,547
Patented May 2, 1967

3,317,547
QUINUCLIDYL ETHERS OF DIBENZO-
CYCLOHEPTADIENE
Claude I. Judd, Mequon, Wis., assignor to Colgate-Palmolive Company, New York, N.Y., a corporation of Delaware
No Drawing. Filed June 24, 1965, Ser. No. 466,836
2 Claims. (Cl. 260—294.7)

This application relates to novel aminoalkyl ethers of the dibenzocycloheptene ring system. More particularly, it relates to the aminoalkyl ethers of 10,11-dihydrodibenzo[a,d]cycloheptene and dibenzo[a,d]cycloheptene and the non-toxic pharmaceutically acceptable salts thereof.

The compounds of the present invention may be represented by the following formula:

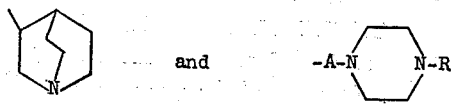

in which Y is selected from the group consisting of

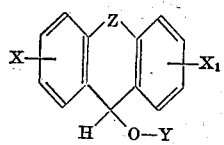 and $-A-N\diagup\diagdown N-R$

Z is selected from the group consisting of —CH=CH— and —$CH_2$—$CH_2$—, X and $X_1$ are selected from hydrogen and halogen, A is an alkyl chain of 2–6 carbons and R is lower alkyl, i.e., 1 to 4 carbon atoms.

The novel ethers of the present invention may be prepared by treating an appropriate alcohol with hydrogen chloride to form the chloro derivative which is in turn treated with an appropriate hydroxyalkyl amine. This process can be represented as follows:

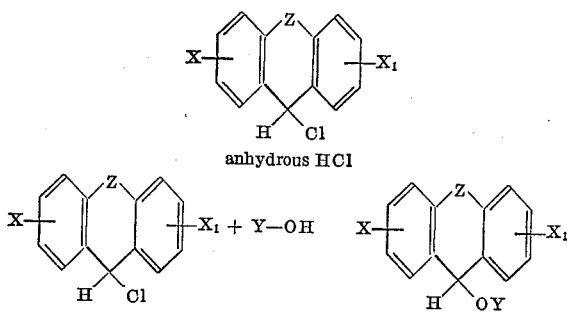

wherein Z, X, $X_1$ and Y are as previously described.

Illustrative of the alcohols which may be employed as starting materials in the above process are:

dibenzo[a,d]cyclohepten-5-ol,
10,11-dihydrodibenzo[a,d]cyclohepten-5-ol,
3-chloro-10,11-dihydrodibenzo[a,d]cyclohepten-5-ol,
3,7-dichloro-10,11-dihydrodibenzo[a,d]cyclohepten-5-ol,
2,3,7,8-tetrachloro-10,11-dihydrodibenzo[a,d]cyclohepten-5-ol, and
3,7-dichlorodibenzo[a,d]cyclohepten-5-ol.

These alcohols may be prepared by the reduction of the corresponding ketones. Generally, it is preferred to dissolve the ketone in ether and treat it with lithium aluminum hydride under reflux conditions. The reaction mixture is then washed with moist ether and aqueous acetic acid and washed with water, dilute sodium hydroxide, and water, respectively, and then dried. C. van der Stelt et al., J. of Med. and Pharm. Chem., 4, 335 (1961). A process for the preparation of the ketones is described by A. Cope and S. W. Fenton in the J. of the Am. Chem. Soc., 73, 1673 (1951).

Illustrative of the hydroxyalkyl amines which may be employed are:

1-methyl-4-hydroxyethyl piperazine,
1-ethyl-4-hydroxypropyl piperazine,
1-propyl-4-hydroxyethyl piperazine, and
3-quinuclidinol.

The novel aminoalkyl ethers are preferably prepared by dissolving the alcohol in a suitable solvent such as dry benzene, cooling the solution and bubbling anhydrous hydrogen chloride through it to produce the corresponding 5-chloro derivative. The 5-chloro derivative is then isolated, dissolved in hot dry xylene and added in one portion to a stirred solution of the hydroxyalkyl amine. The mixture is then stirred at reflux until the reaction is substantially complete. The solvent is then removed under reduced pressure, the residues are dissolved in water, saturated with sodium bicarbonate and extracted into ether. The dried ether extracts are evaporated and the residues distilled under reduced pressure to yield the desired aminoalkyl ether.

Some of the aminoalkyl ethers which may be prepared in the manner described are:

5-(3-quinuclidyloxy)-10,11-dihydro-5H-dibenzo[a,d]cycloheptene,
5-(3-quinuclidyloxy)-5H-dibenzo[a,d]cycloheptene,
5-[β-(4-methyl-1-piperazinyl)ethoxy]-10,11-dihydro-5H-dibenzo[a,d]cycloheptene, and
5-[β-(4-methyl-1-piperazinyl)ethoxy]-5H-dibenzo[a,d]cycloheptene.

The novel ethers of the present invention exhibit central nervous system stimulating activity in animals. Their activity can be defined as mood stimulation and they are, therefore, potential antidepressants. These compounds may also be used as intermediates in the preparation of more complex chemical and pharmaceutical agents.

The compounds of this invention form water soluble acid addition salts with inorganic or organic acids such as hydrochloric acid, hydrobromic acid, sulfonic acid, phosphoric acid, methane sulfonic acid, ethane disulfonic acid, acetic acid, nitric acid, maleic acid, succinic acid, tartaric acid, benzoic acid, phthalic acid and cyclohexyl sulfamic acid. The compounds also form lower alkyl quaternary ammonium salts such as methyl chloride, ethyl bromide and diethyl sulphate.

The compounds can be administered to animals as pure compounds, as the bases or in the form of a pharmaceutically acceptable non-toxic acid addition salt. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as propylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

The following examples are presented to illustrate this invention:

*Example 1.—5-[β-(4-methyl-1-piperazinyl)ethoxy]10, 11-dihydro-5H-dibenzo[a,d]cycloheptene*

Anhydrous hydrogen chloride is bubbled through a cooled solution of 10.5 g. (0.05 mole) 10,11-dihydro-5H-dibenzo[a,d]cyclohepten-5-ol in 100 ml. dry benzene for 1.5 hours. The solution is dried over anhydrous calcium chloride, filtered and evaporated under reduced pressure. The resulting compound is dissolved in 50 ml. hot dry xylene and added in one portion to a stirred solution of 14.4 g. (0.10 mole) of 1-methyl-4-hydroxyethyl piperazine in 50 ml. dry xylene and the mixture stirred at reflux for three hours. After removing the xylene under reduced pressure, the residues are dissolved in water, saturated with sodium bicarbonate and extracted into ether. The dried ether extracts are evaporated, and the residues distilled under reduced pressure yielding 5-[β-(4-methyl-1-piperazinyl)ethoxy]-10,11-dihydro - 5H - dibenzo[a,d]cycloheptene, B.P. 210–216° C. (0.02 mm.).

The resulting ether (0.022 mole) is dissolved in 200 ml. anhydrous ethyl ether and the pH adjusted to 7 with 7 ml. of a solution of 2.55 g. (0.022 mole) maleic acid in 15 ml. ethanol. The white solids which form are collected by anhydrous filtration and recrystallized from a refluxing solution of 300 ml. ethyl acetate and 80 ml. ethanol. The solids which form on cooling are collected by filtration yielding the bis maleate salt, M.P. 174–175° C.

*Analysis.*—Calcd. for $C_{30}H_{36}N_2O_9$: C, 63.36; H, 6.38. Found: C, 63.12; H, 6.26.

*Example 2.—5[β-(4-methyl-1-piperazinyl)ethoxy]-5H-dibenzo[a,d]cycloheptene*

The procedure of Example 1 is employed to produce 5[β-(4-methyl - 1 - piperazinyl)ethoxy]-5H-dibenzo[a,d]cycloheptene. The alcohol used as the starting material is dibenzo[a,d]cyclohepten-5-ol.

*Example 3.—5-(3-quinuclidyloxy)-10,11-dihydro-5H-dibenzo[a,d]cycloheptene*

The compound is prepared by the procedure of Example 1, except that 3-quinuclidinol is utilized as the hydroxyalkylamine. The base is purified by distillation under reduced pressure to yield the crude product which solidifies on standing, and which upon recrystallization from hot n-hexane yields crystalline 5-(3-quinuclidyloxy)-10, 11-dihydro - 5H - dibenzo[a,d]cycloheptene, M.P. 112–113° C.

*Analysis.*—Calcd. for $C_{22}H_{25}NO$: C, 82.78; H, 7.89. Found: C, 82.75; H, 7.97.

*Example 4.—5-(3-quinuclidyloxy)-5H-dibenzo[a,d]cycloheptene*

The procedure of Example 3 is employed to produce 5-(3-quinuclidyloxy)-5H-dibenzo[a,d]cycloheptene. The alcohol used as the starting material is dibenzo[a,d]cyclohepten-5-ol.

I claim:
1. 5-(3-quinuclidyloxy) - 10,11 - dihydro-5H-dibenzo[a,d]cycloheptene.
2. 5-(3-quinuclidyloxy)-5H-dibenzo[a,d]cycloheptene.

References Cited by the Examiner
UNITED STATES PATENTS 2,985,660   5/1961   Judd et al. _____ 260—268
3,227,716   1/1966   Harms _____ 260—268

ALEX MAZEL, *Primary Examiner.*

H. R. JILES, *Assistant Examiner.*